(12) United States Patent
Wolf (10) Patent No.: US 7,380,605 B1
(45) Date of Patent: Jun. 3, 2008

(54) ENERGY TRANSFER LOOP APPARATUS AND METHOD OF INSTALLATION

(76) Inventor: Clifton E. Wolf, 5709 Cheswood St., Houston, TX (US) 77087

( * ) Notice: Subject to any disclaimer, the term of this patent is extended or adjusted under 35 U.S.C. 154(b) by 50 days.

(21) Appl. No.: 11/045,983

(22) Filed: Jan. 31, 2005

(51) Int. Cl.
*E21B 36/00* (2006.01)
*E21B 17/18* (2006.01)

(52) U.S. Cl. .................. 166/302; 166/57; 166/290; 175/17; 175/67

(58) Field of Classification Search ............... 166/302, 166/57, 288, 290; 175/17, 67
See application file for complete search history.

(56) References Cited

U.S. PATENT DOCUMENTS

| 3,396,806 | A | * | 8/1968 | Benson ..................... 376/273 |
| 4,301,875 | A | * | 11/1981 | Munding et al. ............. 175/12 |
| 4,523,644 | A | * | 6/1985 | Dismukes ................... 166/302 |
| 4,574,875 | A | * | 3/1986 | Rawlings et al. ............ 165/45 |
| 5,291,956 | A | * | 3/1994 | Mueller et al. ............... 175/67 |
| 5,590,715 | A | * | 1/1997 | Amerman ................... 166/290 |
| 5,758,724 | A | * | 6/1998 | Amerman ................... 166/290 |
| 5,771,984 | A | * | 6/1998 | Potter et al. ................. 175/14 |
| 6,041,862 | A | * | 3/2000 | Amerman ................... 166/290 |
| 6,250,371 | B1 | * | 6/2001 | Amerman et al. ............ 165/45 |
| 6,742,603 | B2 | * | 6/2004 | Polizzotti et al. ............ 175/17 |
| 6,860,320 | B2 | * | 3/2005 | Johnson et al. .............. 165/45 |
| 6,920,924 | B2 | * | 7/2005 | Roesch et al. ............... 166/71 |
| 6,955,219 | B2 | * | 10/2005 | Johnson, Jr. ................ 166/286 |
| 7,017,650 | B2 | * | 3/2006 | Johnson et al. .............. 165/45 |
| 2003/0121701 | A1 | * | 7/2003 | Polizzotti et al. ............ 175/17 |
| 2003/0221870 | A1 | * | 12/2003 | Johnson, Jr. ................ 175/71 |
| 2004/0031585 | A1 | * | 2/2004 | Johnson et al. .............. 165/45 |
| 2005/0072567 | A1 | * | 4/2005 | Steele et al. ............. 166/272.3 |

* cited by examiner

*Primary Examiner*—Jennifer H Gay
(74) *Attorney, Agent, or Firm*—Egbert Law Offices (57) ABSTRACT

A method of forming an energy transfer loop in the earth has the steps of connecting a tubing to a nose member, extending a liquid delivery pipe to the nose member, pumping a liquid through the liquid delivery pipe to the nose member, jetting the liquid from the nose member so as to form an excavation in the earth and pushing the nose member downwardly through the opening in the earth a desired distance below a surface of the earth. A jacket can be affixed around the liquid delivery pipe so as to allow the liquid delivery pipe to be removed from the nose member subsequent to the installation in the earth.

12 Claims, 5 Drawing Sheets

ENERGY TRANSFER LOOP APPARATUS AND METHOD OF INSTALLATION

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to energy transfer loops. More particularly, the present invention relates to energy transfer loops whereby a heat transfer relationship occurs between the earth and a fluid passing through the loop in the earth. More particularly, the present invention relates to methods for installing such energy transfer loops into the earth. The present invention also relates to energy transfer loop apparatus.

BACKGROUND OF THE INVENTION

It is known in prior art systems that energy transfer loops can be installed in the earth. These energy transfer loops generally consist of a length of tubing that is buried in the earth a desired distance so that a fluid passing through the tubing will experience heat transfer effects with the area of the earth in which the tubing extends. In certain circumstances, these energy transfer loops are operated in association with heating and air conditioning systems associated with commercial establishments and residential buildings. The energy transfer loop is used in association with or in place of such conventional energy transfer systems in which air is passed over refrigerant loops for the purposes of creating the air conditioning or heating effects.

For example, in warm weather environments, during times when air conditioning is required, air conditioning refrigerant fluid is caused to expand and subsequently yield the desired cooling effects. When the air conditioning refrigerant fluid is again compressed prior to the next expansion cooling cycle, this fluid becomes hot as a result of the compression. Current conventional air conditioning systems force ambient air over this refrigerant fluid to cool it before the next compression cycle. As the geothermal temperatures of the earth's soil are significantly cooler than the ambient air, use of the cooler fluid which has circulated through energy transfer loops installed in the earth, will provide greater heat transfer effects. As such, the overall efficiency of the air conditioning process improves and the energy requirements are significantly reduced In heating systems, the temperature of the earth will be elevated relative to the ambient temperature. As a result, the energy transfer loop will pass through the earth so as to generally warm the cooled fluid within the loop. As a result, the energy requirements for elevating the temperature of the cool fluid within the loop are reduced which function opposite to the process described hereinabove.

Unfortunately, in the past, the cost of installing such energy transfer loops in the earth has been considerable. The economic cost for installing such loops can offset any beneficial energy saving costs and effects. As a result homeowners and business owners have avoided the use of such energy transfer loops in view of the considerable capital cost involved during the processes of installing the loop. Conventionally, a drilling contractor must be called so as to form the borehole in the earth. The driller will bring a great deal of drilling equipment to the desired location and begin the drilling activities. In certain circumstances, the earth will include rock formations which will require rather complex drilling activities. Still, in other circumstances, drilling equipment can be damaged because of the rock formations in the earth. In any circumstance, the cost of contracting with a driller to form the required borehole in the earth will greatly add to the capital cost of the air conditioning and/or heating system.

In certain areas of the country, such as the Gulf Coast, the surface of the earth is formed of an unconsolidated soil. This unconsolidated-type soil is easily displaced. As a result, the use of drills, and other boring equipment, can be an "overkill" in order to establish the requisite size of borehole for subsequent loop installation. Additionally, in such unconsolidated-type soils, the earth can often collapse in on itself during the drilling activity so as to make the formation of a borehole difficult and ineffective. This further complicates the goal of loop installation.

In the past, various patents have issued relating to the installation to the installation of such heat transfer loops. For example, U.S. Pat. No. 5,590,715, issued on Jan. 7, 1997 to T. R. Amerman, describes an underground heat exchange system. This system employs the installation of a pipe loop and a grout pipe in a wellbore. The system is used to grout the wellbore by releasing the grout pipe from the pipe loop or from a bottom member connected to the pipe loop, and then introducing grout through the pipe into the wellbore as the grout pipe is removed upwardly from the wellbore.

U.S. Pat. No. 5,758,724, issued on Jun. 2, 1998 to T. R. Amerman, also describes a method for simultaneously installing a pipe loop in the earth. In this patent, a coiled tubing unit is used to drill heat loop boreholes. The coiling tubing unit has a reel on which is wrapped a continuous flexible steel tubing, an injector which transports the tubing into and out of the hole, a drill bit on the end of a downhole motor, and a pump which supplies fluid for drilling. The motor is rotated by the pump pressure from the surface which allows the unit to drill. A grouting pipe is held in the bottom member. A pulling force applied to the grouting pipe releases it from the bottom member for removal from the wellbore as grout flows out from the bottom of the grouting pipe.

U.S. Pat. No. 6,041,862, issued on Mar. 28, 2000 to T. R. Amerman, teaches a ground heat exchange system which employs a heat loop, a reel of coil tubing releasably attached to the heat loop, and a curved member secured to the lower end of the heat loop. The coil tubing is used for pushing the heat loop into the borehole. The borehole is formed by directly drilling into the surface of the earth a desired distance. Subsequent to installation, the grouting pipe can be removed by applying a pulling force thereto.

U.S. Pat. No. 6,250,371, issued on Jun. 26, 2001 to Amerman et al., discloses an energy loop transfer system. This system employs a means for measuring the amount of energy transferred, a means for invoicing for the energy transferred, and the energy transfer system. The energy transfer system has a wellbore loop in the earth extending from the surface of the earth toward a bottom of the wellbore, a loop disposed in the wellbore and extending toward the bottom of the wellbore and a bottom member.

The bottom member has a body with a first bore and second bore in which the second bore is not in fluid communication with the first bore.

The problem with these prior art systems described in the aforementioned Amerman patents is that a complex drilling activity is required. In particular, each of these systems requires that a drilling apparatus being employed for the purpose of drilling a borehole into the earth. In certain of these patents, the drilling apparatus actually includes a fluid-activated drill so that directional drilling can be achieved. Subsequent to forming the borehole into the earth, these prior art patents require that a grouting process be used so as to seal the borehole. This employs the passing of grout through the bottom member of the energy loop. The grouting material is passed through the piping so as to extend around the periphery of the energy loop. Analyses associated with these systems have indicated that they are not very cost effective when employed in soft soil conditions, such as those in the Gulf Coast region. Large costs associated with drilling and casing will offset the beneficial energy savings associated with such energy loop systems.

It is an object of the present invention to provide a method and an apparatus for forming and/or installing an energy transfer loop which is effective in soft soil conditions.

It is another object of the present invention to provide a method and an apparatus for forming and/or installing an energy transfer loop which minimizes the cost associated with the excavation of the earth.

It an other object of the present invention to provide a method and an apparatus for forming and/or installing an energy transfer loop in which the liquid delivery piping can be removed subsequent to installation.

It is a further object of the present invention to provide a method and an apparatus for forming and/or installing an energy transfer loop which maximizes the energy transfer effects between the earth and the fluid passing through the energy transfer loop.

It is still another object of the present invention to provide a method and an apparatus for forming and/or installing an energy transfer loop which is cost effective, easy to use and time efficient.

These and other objects and advantages of the present invention will become apparent from a reading of the attached specification and appended claims.

BRIEF SUMMARY OF THE INVENTION

The present invention is a method of forming an energy transfer loop into the earth that comprises the steps of: (1) connecting a tubing to a nose member; (2) connecting a liquid delivery pipe to the nose member; (3) pumping a liquid through the liquid delivery pipe to the nose member; (4) jetting the liquid from the nose member so as to form an excavation in the earth; and (5) pushing the nose member downwardly through the earth a desired distance below a surface of the earth as the excavation is being formed in the earth.

In the present invention, a nose member is formed having a first channel and a second channel therein. The first channel is in fluid communication with the second channel. A first tubing is connected to the first channel and a second tubing is connected to the second channel. The step of forming the nose member includes forming a liquid delivery channel in the nose member and forming a liquid ejection nozzle at an end of the liquid delivery channel. This liquid ejection nozzle is positioned adjacent to a bottom of the nose member. The step of connecting a liquid delivery pipe includes connecting the liquid delivery pipe to the liquid delivery channel.

In the present invention, a jacket can be applied around the liquid delivery pipe during the step of pushing. There is also the step of sliding the liquid delivery pipe through the jacket away from the nose member subsequent to the step of pushing.

The present invention is also an energy transfer apparatus that comprises a nose member having a fluid channel extending therethrough, a first tubing connected to an inlet opening of the fluid channel, and a second tubing connected to an outlet opening of the fluid channel. The nose member has a liquid jetting means formed adjacent to a bottom of the nose member. This liquid jetting means is for forming an excavation in the earth when the nose member is positioned a desired distance from the surface of the earth.

In this apparatus, the nose member further comprises a liquid delivery channel formed in the nose member so as to extend from the top of the nose member to the liquid jetting means. A liquid delivery pipe is removably received by the liquid delivery channel. This liquid delivery pipe extends to the surface of earth through the excavation. The liquid delivery pipe has a shoulder formed therein. The liquid delivery pipe is slidably received by the liquid delivery channel. The shoulder abuts the top of the nose member when the liquid delivery pipe is received within the liquid delivery channel.

The liquid jetting means is formed on the bottom end of the nose member. The liquid jetting means comprises a nozzle. This nozzle extends downwardly below of the bottom of the nose member. The nose member has a flute extending along an exterior surface thereof between the top and the bottom of the nose member. The flute is positioned generally between the inlet opening and the outlet opening.

In the apparatus of the present invention, the fluid channel comprises a first channel extending longitudinally in the nose member, a second channel in generally longitudinally parallel relationship to the first channel, and connection section in fluid communication with the first and second channels at the bottoms thereof so as to allow a heat transfer fluid to flow between the first and second channels. A jacket is affixed to the top of the nose member around the liquid delivery channel. The jacket extends to the surface of the earth through the excavation. This jacket has a first edge and a second edge extending longitudinally therealong. The first edge is joined to the second edge thereby forming a continuous closed conduit extending back to the surface of the earth. Each of the first and second tubings is a length of coiled tubing. A pumping means is provided in fluid communication with the liquid jetting means. This pumping means serves to pass a liquid under pressure to the liquid jetting means.

DETAILED DESCRIPTION OF THE INVENTION

Figure 1:
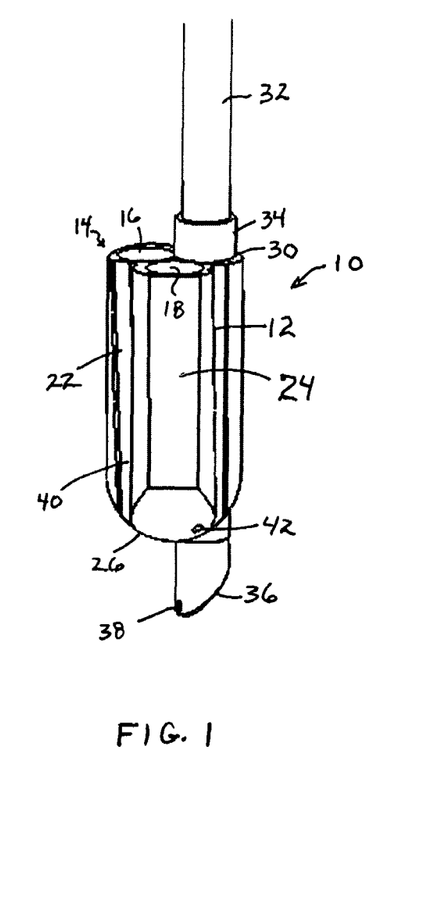
FIG. 1 is a perspective view showing the apparatus for forming an energy transfer loop in accordance with the preferred embodiment of the present invention.

Referring to FIG. 1, there is shown an illustration of the energy transfer apparatus 10 in accordance with the preferred embodiment of the present invention. The energy transfer apparatus 10 include a nose member 12 having a fluid channel 14 formed therein. The fluid channel 14 has an inlet opening 16 and an outlet opening 18 formed at a top 20 thereof. The inlet opening 16 opens to a first channel 22. The outlet opening 18 opens to a second channel 24. The first channel 22 and the second channel 24 are in fluid communication with each other at a connection section 26 located adjacent a bottom 28 of the nose member 12. In normal use, a first tubing will be connected to the inlet opening 16 associated with the first channel 22. A second tubing will be connected to the outlet opening 18 associated with the second channel 24. As a result, a heat transfer fluid can be passed through the channels 22 and 24 and therebetween through the connection section 26. The nose member 12 can be formed of a rigid material suitable for withstanding the forces of being inserted into the earth and maintained within the earth.

The energy transfer apparatus 10 also includes a liquid delivery channel 30 formed in the nose member 12 so as to extend from the top 20 to the bottom 28. A liquid delivery pipe 32 is illustrated as extending through the liquid delivery channel 30. The liquid delivery pipe 32 has a shoulder 34 extending radially outwardly therearound and in abutment with the top surface 20 of the nose member 12. The liquid delivery pipe 32 is slidably received within the liquid delivery channel 30. The liquid delivery pipe 32 has a water ejecting nozzle 36 formed adjacent to the bottom end 28 of the nose member 12. The water ejecting nozzle 36 can have small openings, such as opening 38 and/or associated nozzles, so as to allow for liquids under pressure to be directed outwardly therefrom. As a result, the liquid ejecting nozzle 38 will allow for the formation of an excavation in the earth as the nose member 12 is being inserted into the earth. This process of forming an excavation is akin to the sinking of one's foot in the sand at the beach. Soil is displaced around the nose member so as to allow it to move downwardly by the action of soil displacement.

A flute 40 will extend from the top 20 to the bottom 28 of the nose member 12. Flute 40 is generally formed between the first channel 22 and the second channel 24. Flute 40 allows for the liquids ejected by the liquid ejecting nozzle 38 to be passed upwardly through the excavation. Additionally, the flute 40 allows for the flow of materials associated with the ejected liquid to also pass upwardly around the periphery of the nose member 12. The flute 40 provides a suitable mechanism whereby excavated materials can be effectively removed from the excavation and delivered upwardly toward the top of the excavation.

In FIG. 1, it can be seen that an optional liquid ejection nozzle 42 can be formed adjacent to the connection section 26 of the nose member 12. In this form of the invention, it is possible to use a liquid passing through the channels 22 and 24 to be delivered for the purposes of excavating the earth. Although the nozzle 42 is illustrated in FIG. 1, it is merely illustrative of an alternative form of the present invention.

Figure 2:
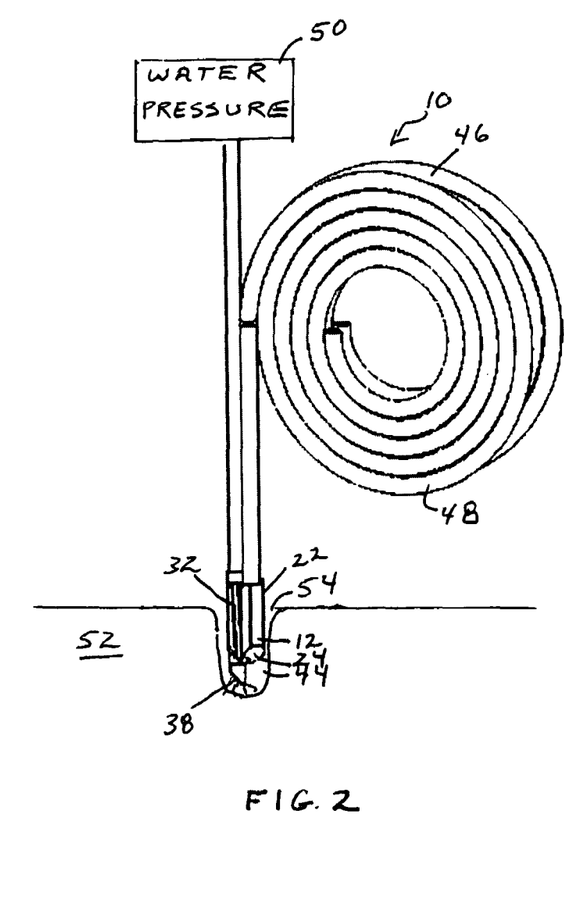
FIG. 2 is an illustration of the initial steps of forming the energy transfer loop in accordance with the preferred embodiment of the present invention.

In FIG. 2, it can be seen that how the apparatus 10 of the present invention can be used for the formation of an excavation 44 in the earth. In FIG. 2, the nose member 12 has its first channel 22 connected to a first tubing 46. The second channel 24 is connected a second tubing 48. Each of the tubings 46 and 48 is a length of coiled tubing that can be wrapped around reels and delivered into the excavation 44 as the excavation 44 is being formed into the earth. The liquid delivery pipe 32 is illustrated as connected to a source of water pressure 50. As a result, the water pressure produced by the source 50 can be delivered through the liquid delivery pipe 32 so as to be ejected by the nozzles 38 located at the bottom of the nose member 12. The ejection of water under very high pressures, such as 300 p.s.i., will cause the soil 52 surrounding the excavation 44 to be displaced outwardly therefrom. This allows the nose member 12 to sink in the soil to a desired location below the surface of the earth.

Figure 3:
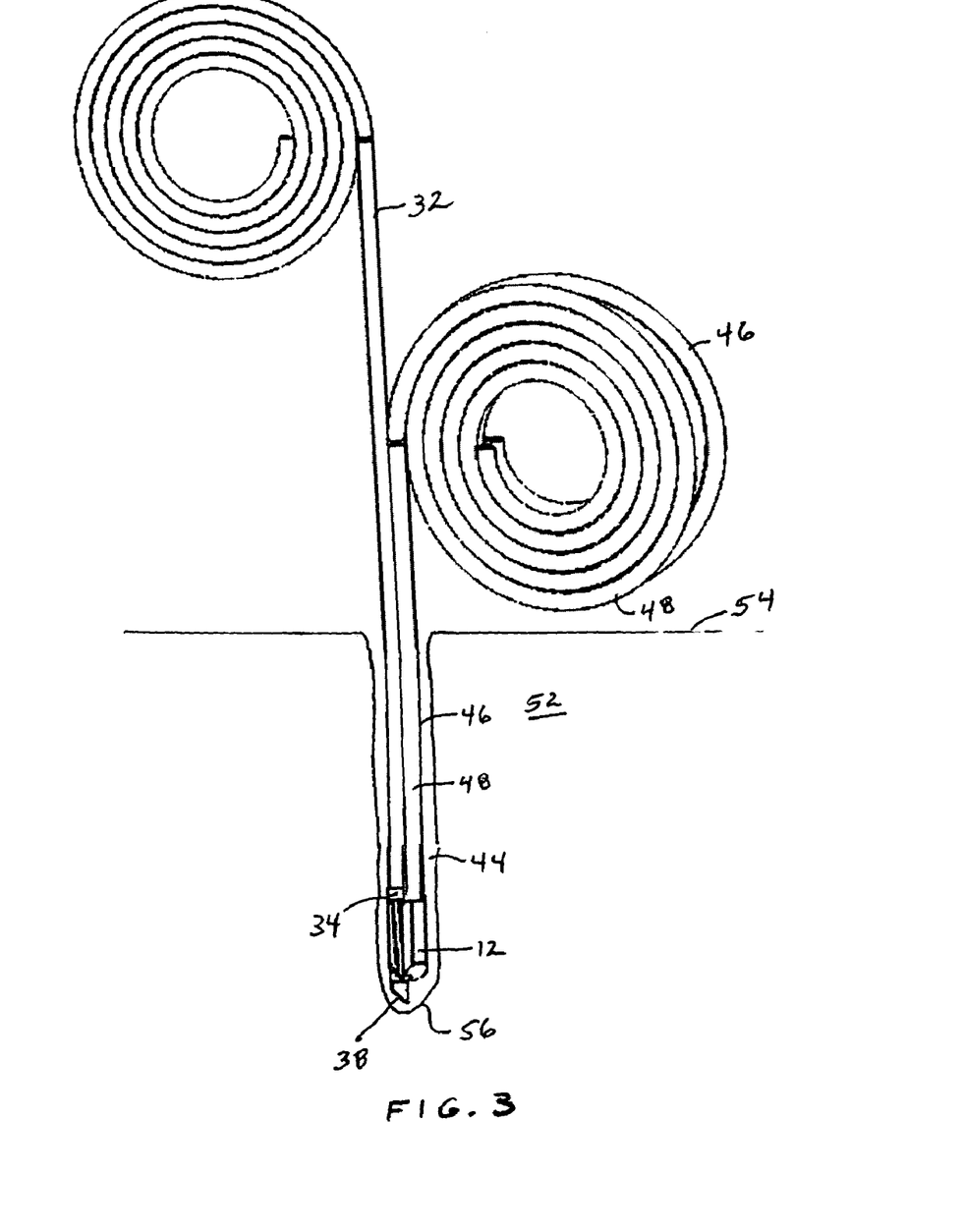
FIG. 3 illustrates a later stage in the formation of the energy transfer loop in accordance with the preferred embodiment of the present invention.

Referring to FIG. 3, it can be seen that the nose member 12 is now positioned adjacent to the bottom 56 of the excavation 44. The ejection of water pressure outwardly of the nozzle 38 allows the nose member 12 to move through the unconsolidated soil to the bottom 56 of the excavation 44. The tubings 46 and 48 can be suitably manipulated so as to urge the nose member 12 downwardly into the excavation 44 and, thereby, form the excavation 44 for a desired distance below the surface 54 of the earth 52.

Subsequent to installation, the liquid delivery pipe 32 can be removed from the nose member 12 by simply pulling the liquid delivery pipe 32 upwardly and outwardly from the nose member 12 and through the excavation 44. Since the liquid delivery pipe 32 is only used to urge the nose member 12 downwardly into the excavation 44, the liquid delivery pipe 32 is only slidably received within the liquid delivery channel 30 of the nose member 12. The downward pressure caused by the forces exerted onto the liquid delivery pipe 32 are imparted through the nose member 12 through the shoulders 34. Since there is nothing retaining the liquid delivery pipe 32 within the nose member 12, the pipe 32 can easily be removed for use on other installations. The energy transfer fluid is now free to flow between the tubings 46 and 48 through the channels within the nose member 12. If required, the walls of the excavation 44 can be suitably sealed.

Figure 4:
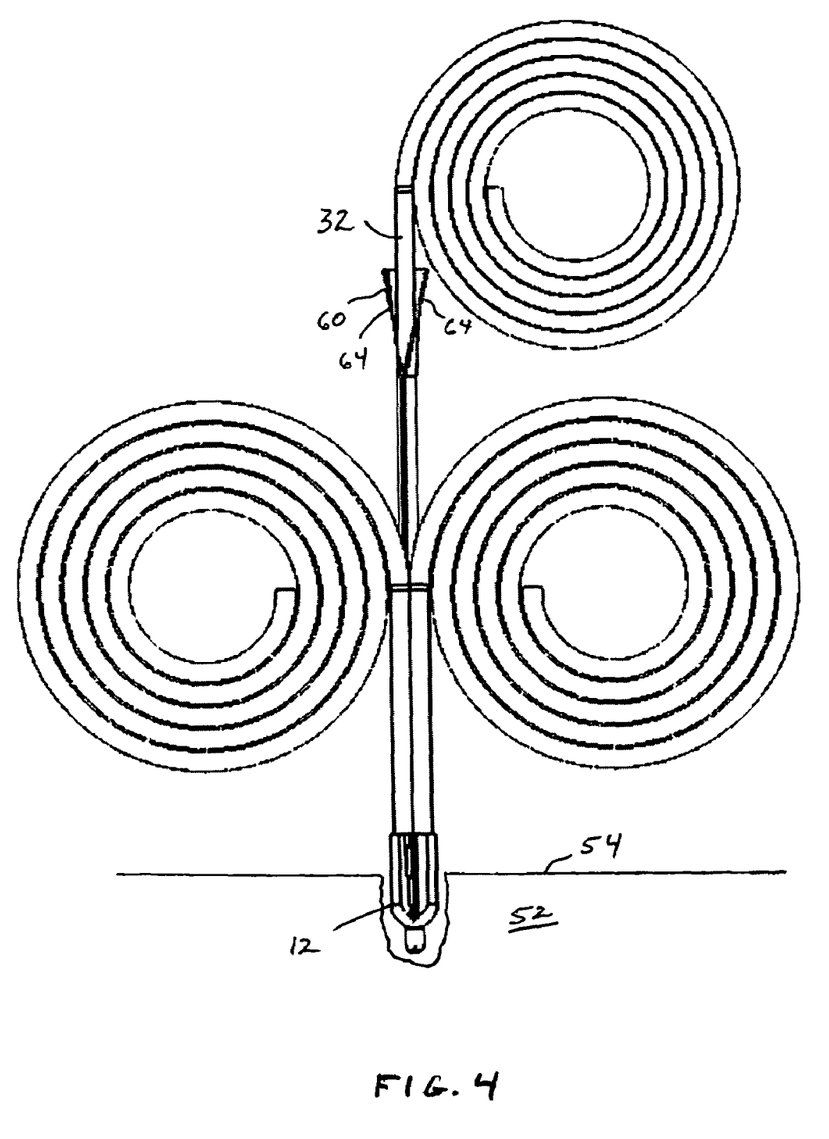
FIG. 4 is an illustration of an initial stage in the formation of an energy transfer loop in accordance with an alternative embodiment of the present invention.

FIG. 4 shows an alternative form of the present invention. The alternative form of the present invention is very similar to that illustrated in FIG. 2 but for the use of a jacket 60 that surrounds the liquid delivery pipe 32. The jacket 60 has a first edge 62 and a second edge 64. A sealing mechanism is provided adjacent to the surface 54 of the earth 52 so as to join the edges 62 and 64 together around the liquid delivery pipe 32 as the liquid delivery pipe 32 is urged into the earth during the excavation 44 of the earth. When installed, the jacket 60 will surround the liquid delivery pipe 32 and extend upwardly from the top of the nose member 12. The nose member 12 has a identical construction to that described in association with FIGS. 2 and 3.

Figure 5:
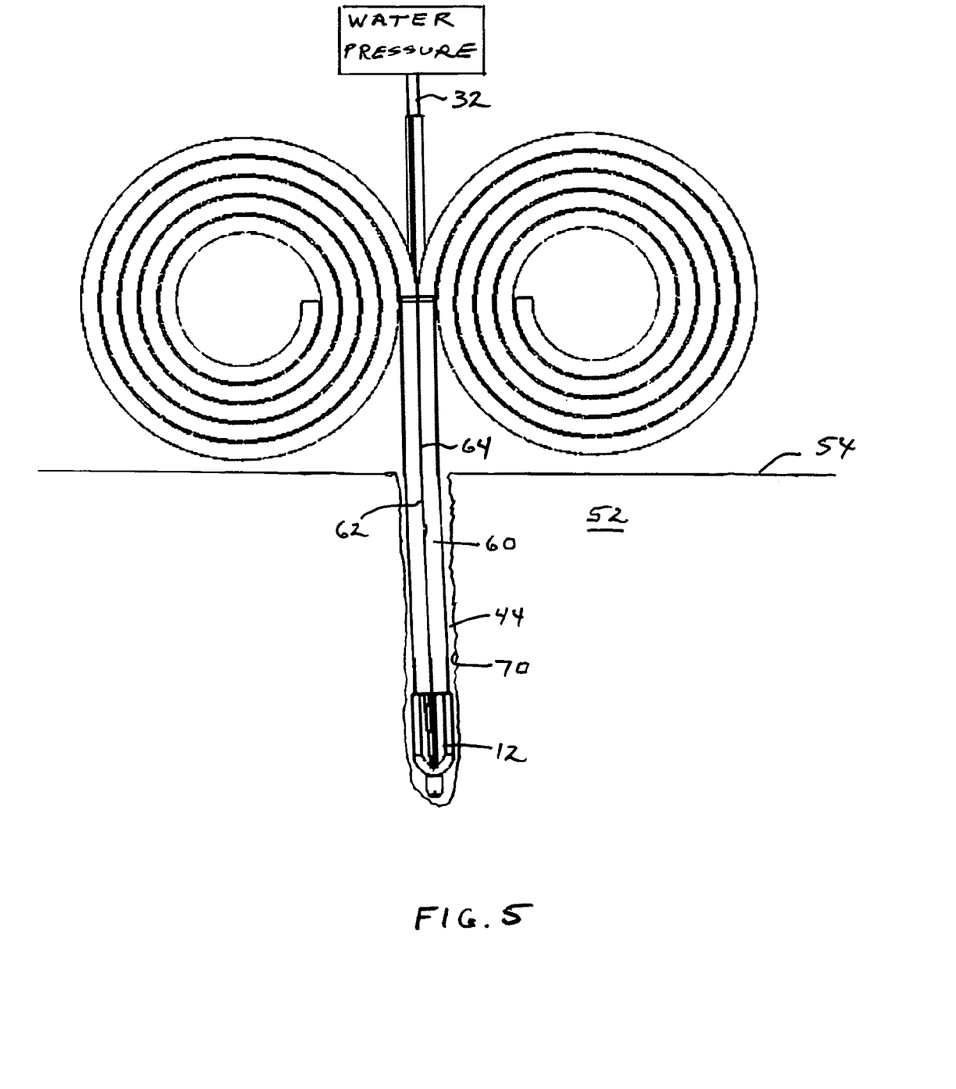
FIG. 5 is an illustration of a later stage in the formation of the energy transfer loop in accordance with the alternative embodiment of the present invention of FIG. 4.

As can be seen in FIG. 5, the jacket 60 has the edges 62 and 64 joined together so as to extend longitudinally along the length of the liquid delivery pipe 32. The jacket 60 will extend from the top of the nose member 12 to the surface 54 of the earth 52. The space between the interior wall of jacket 60 and the exterior of the liquid delivery pipe 32 provides an annulus whereby the liquid delivery pipe 32 can be easily manipulated. The displaced soil at the walls 70 of the excavation 44 will collapse around the nose member 12 and/or against the surfaces of the liquid delivery pipe 32. In other circumstances, the liquid delivery pipe 32 may become sand-locked within the excavation 44. Such sand-locking can occur when the flow of the liquid is interrupted and any sand within the outwardly flowing liquid will fall downwardly. Since the jacket 60 is used, any sand or earth which will fall against the surfaces of the pipe 32 will only contact the jacket 60 and be prevented from directly contacting the pipe 32.

Figure 6:
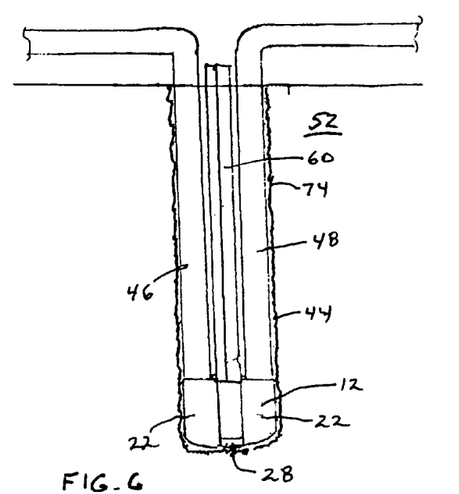
FIG. 6 is an illustration of the final installation of the energy transfer loop in accordance of the alternative embodiment of the present invention.

As can be seen in FIG. 6, the liquid delivery pipe 32 has been removed from the interior of the jacket 60. The first tubing 46 and the second tubing 48 are illustrated as extending into the excavation 44 to the nose member 12. The tubings 46 and 48 are connected by the channels 22 and 24, respectively, on the interior of the nose member 12. A suitable connection section 28 will allow for fluid communication between the channels 22 and 24 so as to allow for a free flow of an energy transfer liquid through the tubings 46 and 48 and outwardly therefrom. The excavation 44 is illustrated as being filled with an earthen material 74. As a result, intimate contact between the walls of the tubings 46 and 48 and the earth 52 is established. Since the jacket 60 is of a relatively inexpensive material, the jacket 60 can remain in place. The liquid delivery pipe associated with the water pumping system can be reused in other locations.

Figure 7:
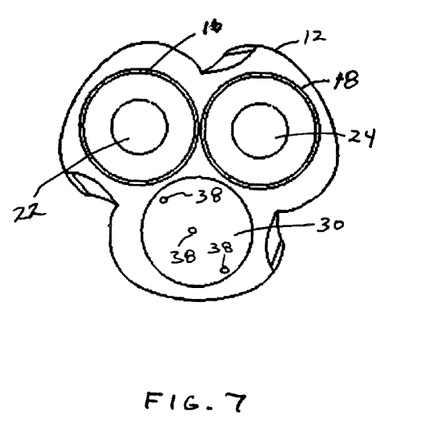
FIG. 7 is a plan view of the nose member illustrated in FIG. 1.

FIG. 7 illustrates the interior of the nose member 12. As can be seen, the nose member 12 includes a first channel 22 and second channel 24 extending thereinto. The inlet opening 16 is formed at the top of the first channel 22. The outlet opening 18 is formed at the top of the second channel 24. The liquid delivery channel 30 is illustrated as positioned generally between the first channel 22 and the second channel 24 on a side of these channels. The water ejection nozzles 38 are illustrated as located at the bottom of the liquid delivery channel 30.

Figure 8:
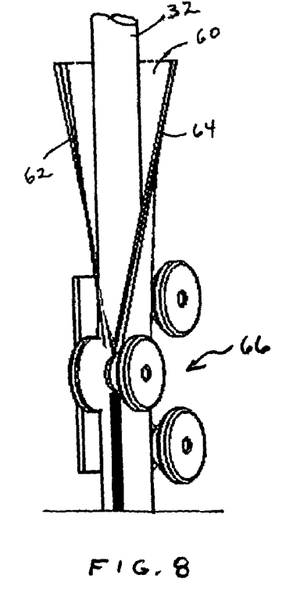
FIG. 8 is a perspective view showing the application of the jacket around the liquid delivery pipe of the alternative embodiment of the present invention.

FIG. 8 illustrates how the jacket 60 is positioned around the liquid delivery pipe 32. The jacket 60 includes a first edge 62 and a second edge 64. The joining mechanism 66 is illustrated at the bottom end of the unsealed portions of the jacket 60. As the pipe 32 is pushed into the earth a desired distance, the joining mechanism 66 will cause the edge 62 to lock upon or into edge 64. As a result, the jacket 60 will surround the periphery of the liquid delivery pipe 32 and define an annulus therebetween. If desired, a grouting material can be placed into the annulus defined between the inner wall of the jacket 60 and the exterior surface of the pipe 32.

Figure 9:
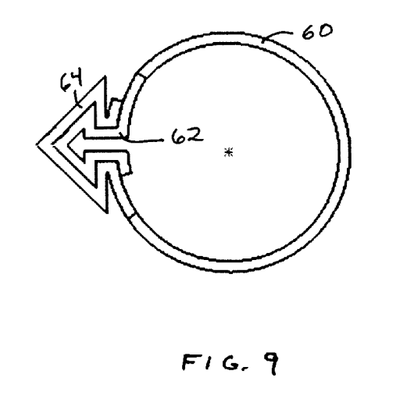
FIG. 9 is an illustration of the manner in which the opposite edges of the jacket can be joined together so as to surround the liquid delivery pipe in the alternative embodiment of the present invention.

In FIG. 9, there is illustrated one example whereby the edge 62 of the jacket 60 can be joined to the edge 64. As can be seen, each of the edges 62 and 64 has interlocking arrowhead-shaped seams. As a result, when the edge 62 is brought in close proximity to the edge 64 these interlocking seams will join each other so as to establish a proper seal longitudinally along the length of the jacket 60. Within the concept of the present invention, various other forms of sealing edges for the jacket 60 can be envisioned. The structure illustrated in FIG. 9 is only one example of such a edge-sealing arrangement for the jacket 60.

The foregoing disclosure and description of the invention is illustrative and explanatory thereof. Various changes in the details of the illustrated construction and in the steps of the described method can be made within the scope of the appended claims without departing from the true spirit of the invention. The present invention should only be limited by the following claims and their legal equivalents.

I claim:

1. A method of forming an energy transfer loop into the earth comprising:
   connecting a tubing to a nose member;
   connecting a liquid delivery pipe to said nose member;
   pumping a liquid through said liquid delivery pipe to said nose member;
   jetting the liquid from said nose member so as to form an excavation in the earth;
   pushing said nose member downwardly through said excavation in the earth to a desired location below a surface of the earth; and
   applying a jacket around said liquid delivery pipe during said step of pushing.

2. The method of claim 1, further comprising:
   sliding said liquid delivery pipe through said jacket away from said nose member subsequent to said step of pushing.

3. The method of claim 1, said step of jetting comprising:
   displacing soil with a jet of water as said nose member is pushed into the earth.

4. An energy transfer apparatus comprising:
   a nose member having a fluid channel extending therethrough, said fluid channel having an inlet opening and an outlet opening;
   a first tubing connected to said inlet opening;
   a second tubing connected to said outlet opening, said nose member having a liquid jetting means formed adjacent a bottom thereof, said liquid jetting means for forming an excavation in the earth when said nose member is positioned in a desired distance from a surface of the earth;
   a liquid delivery channel formed in said nose member so as to extend from a top of said nose member to said liquid jetting means; and
   a jacket affixed to a top of said nose member around said liquid delivery channel, said jacket extending to the surface of the earth through the excavation.

5. The apparatus of claim 4, further comprising:
   a liquid delivery pipe removably received by said liquid delivery channel, said liquid delivery pipe extending to the surface of the earth through the excavation.

6. The apparatus of claim 5, said liquid delivery pipe having a shoulder formed thereon, said liquid delivery pipe slidably received by said liquid delivery channel, said shoulder abutting said top of said nose member.

7. The apparatus of claim 5, said liquid jetting means being a formed on a bottom end of said nose member, said liquid jetting means comprising a nozzle, said nozzle extending downwardly below said bottom of said nose member.

8. The apparatus of claim 4, said nose member having a flute extending along an exterior surface thereof between a top of said nose member and said bottom of said nose member, said flute positioned generally between said inlet opening and said outlet opening.

9. The apparatus of claim 4, said fluid channel comprising:
- a first channel extending longitudinally in said nose member;
- a second channel extending in generally longitudinal parallel relationship to said first channel in said nose member; and
- a connection section in fluid communication with said first and second channels at a bottom thereof so as to allow a heat transfer fluid to flow between said first and second channels within said nose member.

10. The apparatus of claim 4, said jacket having a first edge and a second edge extending longitudinally therealong, said first edge being joined to said second edge.

11. The apparatus of claim 4, each of said first and second tubings being a length of coiled tubing.

12. The apparatus of claim 4, further comprising:
- a pumping means in fluid communication with said liquid jetting means, said pumping means for passing a fluid under pressure to said liquid jetting means.

* * * * *